United States Patent
Sekiya et al.

(10) Patent No.: US 11,882,348 B2
(45) Date of Patent: Jan. 23, 2024

(54) MONITORING CAMERA DEVICE

(71) Applicant: MAINTECH CO., LTD., Tokyo (JP)

(72) Inventors: Hiroshi Sekiya, Tokyo (JP); Hitomaru Sakata, Fuji (JP); Koji Murayama, Fuji (JP)

(73) Assignee: MAINTECH CO., LTD., Tokyo (JP)

( * ) Notice: Subject to any disclaimer, the term of this patent is extended or adjusted under 35 U.S.C. 154(b) by 145 days.

(21) Appl. No.: 17/598,754

(22) PCT Filed: Mar. 18, 2020

(86) PCT No.: PCT/JP2020/012163
§ 371 (c)(1),
(2) Date: Sep. 27, 2021

(87) PCT Pub. No.: WO2020/196212
PCT Pub. Date: Oct. 1, 2020

(65) Prior Publication Data
US 2022/0191353 A1    Jun. 16, 2022

(30) Foreign Application Priority Data
Mar. 28, 2019 (JP) ................... 2019-065041

(51) Int. Cl.
*H04N 23/51* (2023.01)
*G03B 17/02* (2021.01)
*G03B 17/55* (2021.01)

(52) U.S. Cl.
CPC ............. *H04N 23/51* (2023.01); *G03B 17/02* (2013.01); *G03B 17/55* (2013.01)

(58) Field of Classification Search
CPC .. D21F 5/18; D21F 7/00; G03B 17/02; G03B 17/08; G03B 17/55; G03B 17/56; H04N 23/51; H04N 23/52
See application file for complete search history.

(56) References Cited

U.S. PATENT DOCUMENTS

2009/0134005 A1* 5/2009 Sato ................. H04N 23/54
                                                        202/262
2009/0201636 A1* 8/2009 Doherty ............ G06F 1/1656
                                                        710/1

(Continued)

FOREIGN PATENT DOCUMENTS

CN    102395003 A    3/2012
JP    0337416 A2    10/1989
(Continued)

OTHER PUBLICATIONS

The extended European search report of the corresponding EP application No. 20778803.5 dated Nov. 24, 2022.

*Primary Examiner* — Amy R Hsu

(74) *Attorney, Agent, or Firm* — Muncy, Geissler, Olds & Lowe, P.C.

(57) ABSTRACT

To provide a monitoring camera device capable of stably shooting a device under a high-temperature environment. The present invention is directed to a monitoring camera device A used for monitoring a device under a high-temperature environment, the monitoring camera device A including a monitoring camera 1, a housing section 3 containing the monitoring camera 1, and a cooling air pipe 8 for introducing air into the housing section 3, in which the housing section 3 includes a cylindrical main body section 31 and a rear cover section 7 attached to a rear end of the main body section 31, and the cooling air pipe 8 is attached to the rear cover section 7.

6 Claims, 6 Drawing Sheets

(56) References Cited

U.S. PATENT DOCUMENTS

2016/0295095 A1* 10/2016 Jannard .............. H05K 7/20172
2018/0231875 A1*  8/2018 Zanganeh .............. G03B 15/00
2022/0191353 A1*  6/2022 Sekiya ................... G03B 17/55

FOREIGN PATENT DOCUMENTS

| | | |
|---|---|---|
| JP | H03-13100 U | 2/1991 |
| JP | H07-294158 A | 11/1995 |
| JP | H07-122616 B2 | 12/1995 |
| JP | H08-154193 A | 6/1996 |
| JP | 2001-146362 A | 5/2001 |
| JP | 2005084367 A | 3/2005 |
| KR | 2011-0130688 A | 12/2011 |
| WO | 2007097133 A1 | 8/2007 |

* cited by examiner

MONITORING CAMERA DEVICE

TECHNICAL FIELD

The present invention relates to a monitoring camera device, and more specifically to a monitoring camera device capable of stably shooting a device even under a high-temperature environment.

BACKGROUND ART

When devices used for manufactures in various industrial fields continue to be used, problems may occur in the manufactures.

For example, in a papermaking process, a papermaking machine is used as a device.

The papermaking machine has a problem that a pitch (contaminant) derived from a pulp raw material (including recycled pulp) adheres to a constituent member in the papermaking machine by continuing a papermaking process.

As a result, the contaminant is transferred to wet paper to adhere to the wet paper, thereby causing wet paper contamination. This in turn causes paper breakage.

To prevent this, there has been known a monitoring system that monitors a place where wet paper contamination and paper breakage occur.

There has been known a paper quality monitoring device, for example, including a video camera that incorporates traveling paper as a still two-dimensional image, an A/D converter that receives an output of the video camera, a memory that receives an output of the A/D converter, a first image signal processing device that is connected to the memory and issues a calling instruction to the memory and inputs information about the calling instruction, and analyzes formation using frequency analysis and standard deviation processing, a second image signal processing device that receives digital information from the memory in response to the calling instruction issued by the first image signal processing device and analyzes a defect in paper, a third image signal processing device that similarly receives digital information from the memory and analyzes a streak of paper, an operation device that receives respective outputs of the first to third image signal processing devices and respective signals of a jet speed, a wire speed, and a raw material concentration of a papermaking machine and analyzes a correlation between the jet speed, the wire speed, and the raw material concentration and a formation index and the streak, and a display device that is connected to the operation device and displays an output of the operation device (see, e.g. PTL 1).

CITATION LIST

Patent Literature

PTL 1: Japanese Patent Publication No. 07-122616

SUMMARY OF INVENTION

Technical Problem

In a dryer part in a papermaking process, wet paper is dried in a dryer hood covering a dryer roll, a canvas, and a canvas roll. At this time, the wet paper is conveyed at high speed. Accordingly, a contaminant may be scattered, and may adhere to not only the wet paper but also a constituent member in the dryer hood. When the contaminant adheres to the constituent member in the dryer hood, the contaminant drops and is transferred to the wet paper, for example, causing wet paper contamination as a result.

However, the inside of the dryer hood is at high temperature, and therefore is difficult to shoot using a general monitoring camera.

In the quality monitoring device described in PTL 1, described above, paper as a finished product is shot by the video camera, which is not appropriate for monitoring the inside of a dryer hood in the papermaking machine under a high-temperature environment.

If the video camera is used for shooting the inside of the dryer hood in the papermaking machine, an error occurs in the video camera due to a high temperature so that shooting for monitoring may not be able to be continued.

The present invention has been made in view of the above-described circumstances, and is directed to providing a monitoring camera device enabling shooting of a device under a high-temperature environment and capable of performing stable shooting.

Solution to Problems

The present inventors have found that the above-described problems can be solved by using a configuration in which a monitoring camera is contained in a housing section and cooling air is introduced into the housing section, leading to completion of the present invention.

The present invention resides in (1) a monitoring camera device used for monitoring a device under a high-temperature environment, the monitoring camera device including a monitoring camera, a housing section containing the monitoring camera, and a cooling air pipe for introducing cooling air into the housing section, in which the housing section includes a cylindrical main body section and a rear cover section attached to a rear end of the main body section, and the cooling air pipe is attached to the rear cover section.

The present invention resides in (2) the monitoring camera device described in the foregoing item (1) further including a front cover section attached to a front end of the main body section, in which the front cover section is provided with an opening section, and the cooling air is released from the opening section.

The present invention resides in (3) the monitoring camera device described in the foregoing item (1) or (2) further including an inner housing section contained in the housing section, in which the monitoring camera is contained in the inner housing section.

The present invention resides in (4) the monitoring camera device described in the foregoing item (3), in which the rear cover section supports the inner housing section, a gap section is provided between the housing section and the inner housing section, and the cooling air flows through the gap section.

The present invention resides in (5) the monitoring camera device described in the foregoing item (3) or (4), in which the inner housing section is provided with a stage section, and the monitoring camera is placed on the stage section not to contact an inner wall of the inner housing section.

The present invention resides in (6) the monitoring camera device described in any one of the foregoing items (1) to (5), in which the main body section has a heat insulating material embedded in its peripheral direction.

The present invention resides in (7) the monitoring camera device described in any one of the foregoing items (1) to (6), further including an air spraying section including a spraying air pipe attached to the rear cover section and a nozzle section attached to a distal end of the spraying air pipe, in which the nozzle section can spray air toward at least the front of the monitoring camera.

The present invention resides in (8) the monitoring camera device described in any one of the foregoing items (1) to (7), in which the monitoring camera device is used in a dryer hood in a papermaking machine under a high-temperature environment at a temperature of 45° C. or more.

Advantages Effects of Invention

The monitoring camera device according to the present invention includes the housing section containing the monitoring camera, thereby making it possible to prevent the contaminant from adhering to the monitoring camera and to prevent heat from being transmitted to the monitoring camera as much as possible.

At this time, in the monitoring camera device according to the present invention, cooling air is introduced into the housing section from the cooling air pipe attached to the rear cover section, whereby the inside of the housing section can be cooled.

The air to be introduced makes it possible to prevent the contaminant from entering the housing section.

As a result, the monitoring camera device according to the present invention makes it possible to perform stable shooting for the inside of the dryer hood in the papermaking machine even under a high-temperature environment.

In the monitoring camera device according to the present invention, when the front cover section is provided with the opening section, the cooling air is made to flow in from the rear cover section side, and is released from the opening section. That is, the cooling air unidirectionally flows without circulating.

This makes it possible to always cool the monitoring camera with fresh cooling air in the monitoring camera device. The cooling air is released toward the front of the monitoring camera device. Accordingly, the contaminant can be more prevented from entering the housing section from the front of the housing section. As a result, the contaminant can be prevented from adhering to a lens or the like positioned on the front side of the monitoring camera.

The monitoring camera device according to the present invention further includes the inner housing section contained in the housing section. When the monitoring camera is contained in the inner housing section, a double structure of the housing section and the inner housing section exists outside the monitoring camera.

As a result, heat can be more efficiently prevented from being transmitted to the monitoring camera.

The contaminant can be more efficiently prevented from adhering to the monitoring camera.

At this time, when the gap section is provided between the housing section and the inner housing section, an air layer having a low thermal conductivity is formed between the housing section and the inner housing section. Thus, heat from outside the housing section can be more efficiently prevented from being transmitted to the monitoring camera.

If the gap section is not provided, heat transmitted to the housing section may be transmitted to the inner housing section.

In the monitoring camera device according to the present invention, when the monitoring camera is placed on the stage section not to contact the inner wall of the inner housing section, the contact area between the inner housing section and the monitoring camera can be made as small as possible. As a result, even if heat is transmitted to the inner housing section, the heat can be prevented from being transmitted to the monitoring camera.

In the monitoring camera device according to the present invention, when the heat insulating material is embedded in the peripheral direction of the main body section, the housing section itself can be prevented from being heated. As a result, heat from outside can be more prevented from being transmitted to the monitoring camera contained in the housing section.

In the monitoring camera device according to the present invention, the air spraying section can spray air toward at least the front of the monitoring camera. Thus, the contaminant can be more prevented from adhering to the lens or the like positioned on the front side of the monitoring camera.

The monitoring camera device according to the present invention can be favorably used under a high-temperature environment at a temperature of 45° C. or more, like the inside of the dryer hood in the papermaking machine, for example.

DESCRIPTION OF EMBODIMENTS

Figure 1:
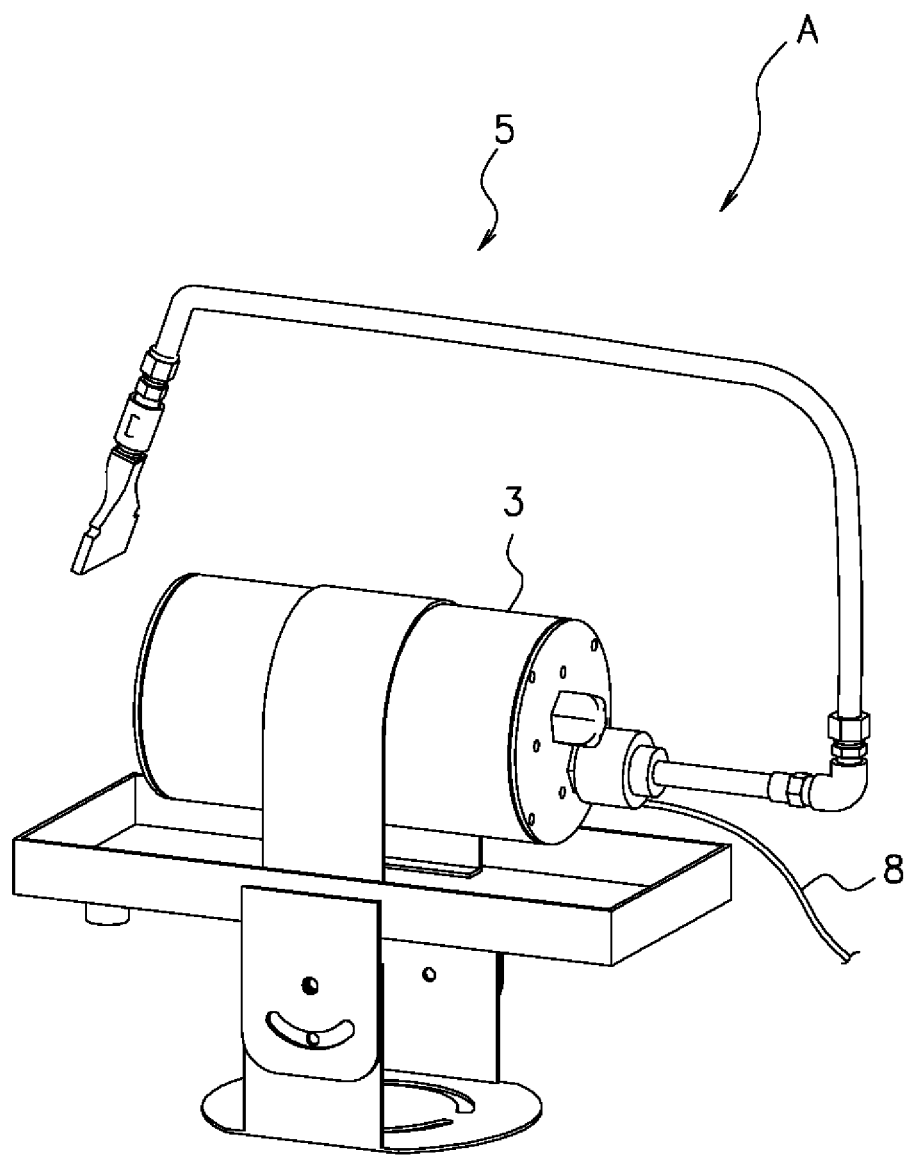
FIG. 1 is a perspective view illustrating a monitoring camera device according to the present embodiment.

Preferred embodiments of the present invention will be described in detail below with reference to the drawings, if necessary.

In the drawings, the same elements will be respectively assigned the same reference numerals to omit overlapping descriptions.

Positional vertical and horizontal relationships are based on positional relationships illustrated in the drawings unless otherwise specified.

Further, dimensional proportions in the drawings are not necessarily limited to those as illustrated.

A monitoring camera device A according to the present invention is used for monitoring a device, is installed in a dryer hood in a papermaking machine, for example, and is used for monitoring the inside of the dryer hood. A configuration of the inside of the dryer hood will be described below.

The inside of the dryer hood in the papermaking machine is generally under at least an environment at a temperature of 45° C. or more. An endurance temperature of a general monitoring camera is 45° C. or less.

The monitoring camera device A makes it possible to perform stable shooting under such an environment and to monitor a place where wet paper contamination and paper breakage occur.

The monitoring camera device A is also favorably used under an environment at a temperature of 60° C. or more and further a temperature of 80° C. or more. The monitoring camera device A is also favorably used not only under a high-temperature environment but also under a humid environment at a dew-point temperature of 45° C. or more and further a dew-point temperature of 60° C. or more.

FIG. 1 is a perspective view illustrating the monitoring camera device A according to the present embodiment.

As illustrated in FIG. 1, the monitoring camera device A includes a monitoring camera not illustrated, a housing section 3 containing the monitoring camera, a cooling air pipe 8 for introducing cooling air into the housing section 3, an air spraying section 5 attached to the housing section 3, a frame 91 for fixing the housing section 3, and a receiving section 92 provided below the housing section 3.

Thus, in the monitoring camera device A, the monitoring camera 1 is contained in the housing section 3, and cooling air can be introduced into the housing section 3 by the cooling air pipe 8. As a result, the monitoring camera device A can perform shooting under a high-temperature environment.

In the monitoring camera device A, the air spraying section 5 can spray air toward at least the front of the monitoring camera 1. As a result, a contaminant can be prevented from adhering to a lens or the like positioned on the front side of the monitoring camera 1.

In the present specification, examples of the contaminant include a pitch, paper powder, or the like floating in the air.

Figure 2:
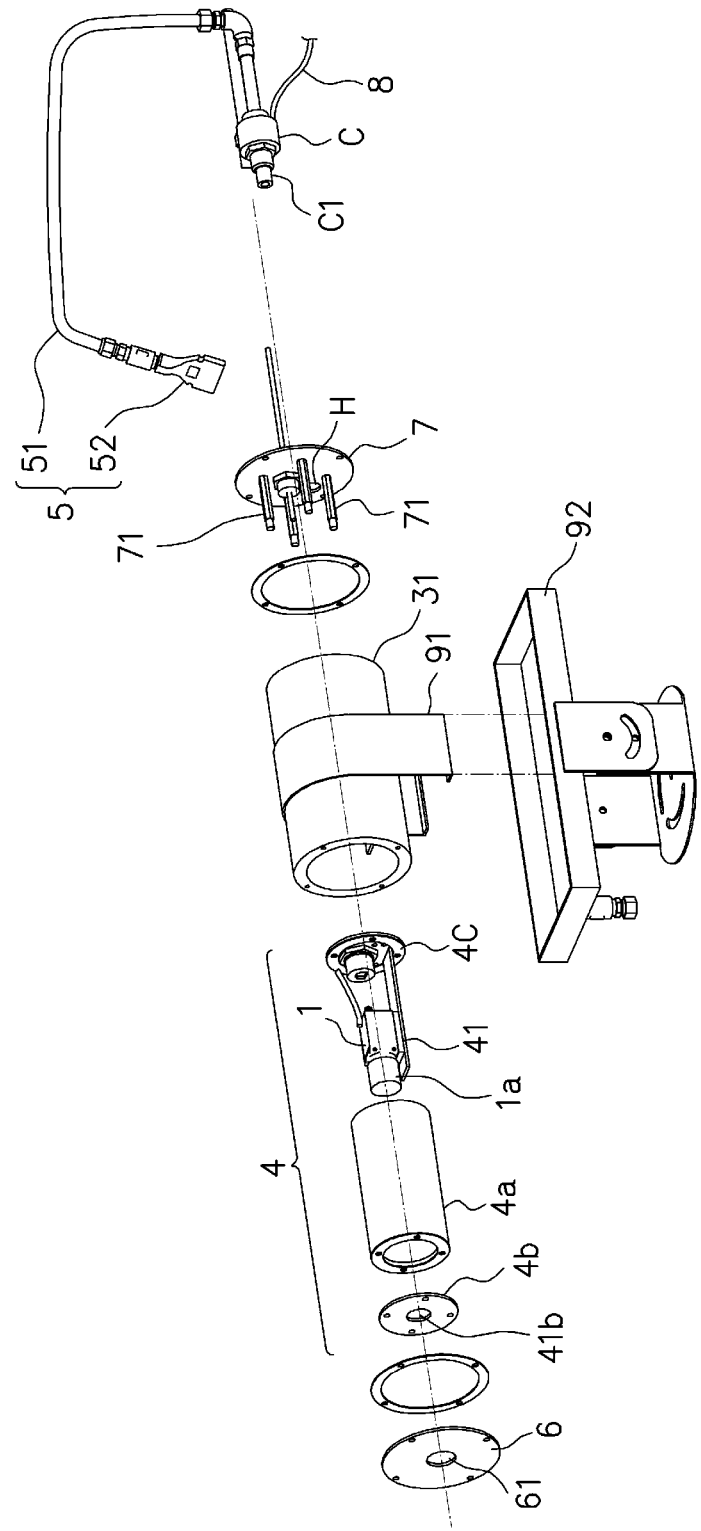
FIG. 2 is a perspective view illustrating the monitoring camera device according to the present embodiment in an exploded manner.
Figure 3:
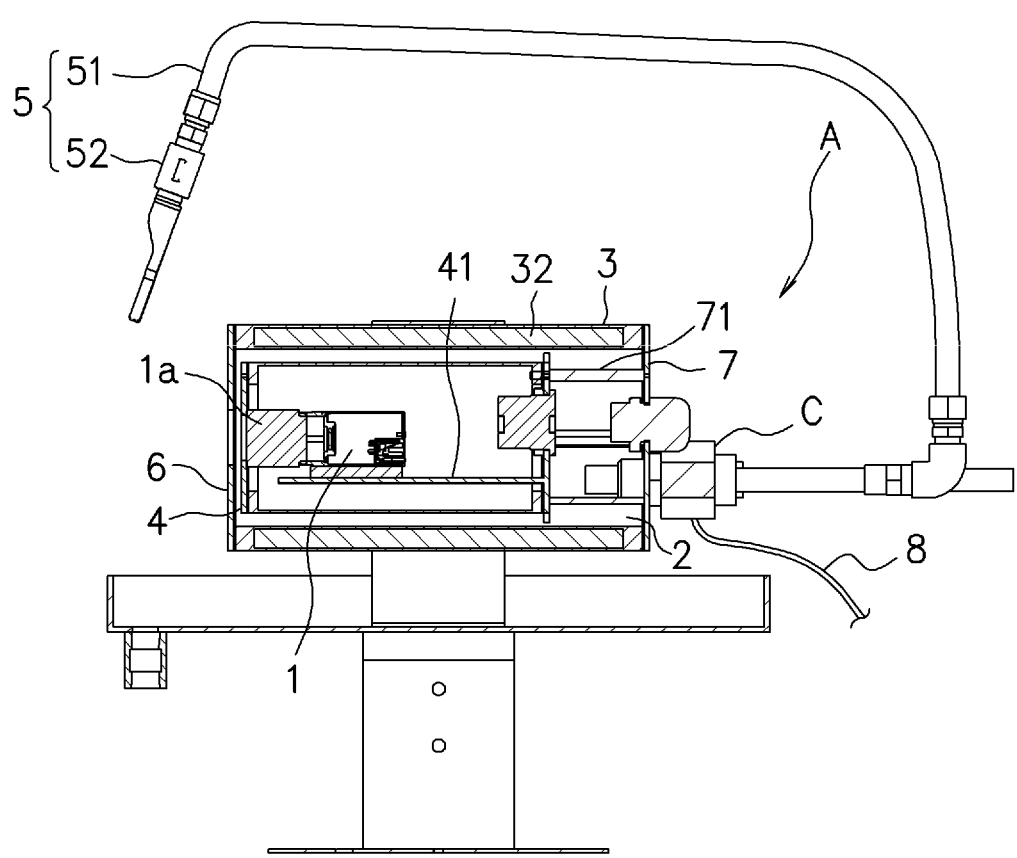
FIG. 3 is a side sectional view illustrating the monitoring camera device according to the present embodiment.

FIG. 2 is a perspective view illustrating the monitoring camera device A according to the present embodiment in an exploded manner, and FIG. 3 is a side sectional view illustrating the monitoring camera device A according to the present embodiment. In FIG. 2, a one-dot and dash line indicates a connection relationship among members in the monitoring camera device A. In this specification, a shooting direction of the monitoring camera device A is a forward direction (toward the left side of the paper plane in FIG. 3), and a direction opposite thereto is a rearward direction (toward the right side of the paper plane in FIG. 3).

As illustrated in FIG. 2 and FIG. 3, in the monitoring camera device A, the housing section 3 contains the inner housing section 4, and the inner housing section 4 contains the monitoring camera 1. That is, outside the monitoring camera 1, a double structure of the housing section 3 and the inner housing section 4 exists.

In the monitoring camera device A, a known monitoring camera can be appropriately adopted as the monitoring camera 1.

A lens cover 1a for protecting the lens of the monitoring camera 1 is attached to the lens. The lens cover may have a zoom function, a camera shake preventing function, a scheimpflug function, and the like.

The monitoring camera 1 includes communication means not illustrated, and the communication means makes it possible to transmit a shot video image to an external computer. This makes it possible to monitor a situation of a constituent member in a papermaking machine at the time of a papermaking process by the external computer.

In the monitoring camera device A, the housing section 3 contains the monitoring camera 1 and the inner housing section 4, described below. That is, the housing section 3 exhibits a function of protecting the monitoring camera 1 from heat or a contaminant.

The housing section 3 includes a cylindrical main body section 31, a front cover section 6 to be attached to a front end of the main body section 31, and a rear cover section 7 to be attached to a rear end of the main body section 31 via a packing.

The main body section 31 has a cylindrical shape, and the inner diameter thereof is a size in which the inner housing section 4, described below, can be accommodated therein.

The main body section 31 is preferably composed of a material having a thermal conductivity of 1.0 or less and preferably 0.3 or less. In this case, external heat can be prevented from being transmitted to the inside of the housing section 3.

A material composing the main body section 31 is not particularly limited, but examples of the material include nickel, iron, and stainless steel.

Among them, stainless steel is favorably used as the material.

The main body section 31 has a heat insulating material 32 embedded therein in its peripheral direction. As a result, the main body section 31 itself can be prevented from being heated. Heat from outside can be prevented from being transmitted to the inner housing section 4 and the monitoring camera 1 contained therein.

The heat insulating material 32 is not particularly limited, but examples of the heat insulating material 32 include glass wool, expanded polystyrene, urethane foam, and aerogel.

The front cover section 6 has a disk shape that matches a shape of the front end of the main body section 31, and has an opening section 61 provided at its substantial center. That is, the front cover section 6 has a donut shape.

The opening section 61 is at a position corresponding to the lens of the monitoring camera 1. Therefore, the monitoring camera 1 contained in the housing section 3 shoots the outside through the opening section 61, and cooling air introduced into the housing section 3 from the cooling air pipe 8 is released to the outside from the opening section 61.

If the opening section 61 has a ventilation hole not preventing shooting and capable of releasing cooling air, a transparent member such as glass or a film may be attached thereto.

The aperture diameter of the opening section 61 is preferably 5 to 50 mm. In this case, the flow rate of air that flows out from the opening section 61 increases, and a contaminant can be more prevented from entering the housing section 3.

As a material composing the front cover section 6, the same material as the above-described material for the main body section 31 can be adopted.

The material for the front cover section 6 may be the same as or different from the material for the main body section 31.

The rear cover section 7 has a disk shape that matches a shape of a rear end of the main body section 31, and includes a rod-shaped support section 71 extending forward.

The support section 71 supports an inner rear cover section 4c in the inner housing section 4, described below.

The rear cover section 7 is provided with a through hole H.

An attachment section C1 in a vortex cooler C, described below, is inserted into the through hole H. As a result, the vortex cooler C is attached to a surface on the rear side of the rear cover section 7.

The cooling air pipe 8 and a spraying air pipe 51 are attached to the vortex cooler C. That is, the cooling air pipe 8 and the spraying air pipe 51 are attached to the rear cover section 7 via the vortex cooler C.

As a material composing the rear cover section 7, the same material as the above-described material for the main body section 31 can be adopted.

The material for the rear cover section 7 may be the same as or different from the material for the main body section 31 or the front cover section 6.

In the monitoring camera device A, the inner housing section 4 is contained in the housing section 3, and contains the monitoring camera 1. That is, the inner housing section 4 exhibits a function of protecting the monitoring camera 1 from heat or a contaminant that has passed through the housing section 3.

The inner housing section 4 includes an inner main body section 4a, an inner front cover section 4b attached to a front end of the inner main body section 4a, and the inner rear cover section 4c attached to a rear end of the inner main body section 4a.

The inner main body section 4a has a cylindrical shape, and can contain the monitoring camera 1.

The inner main body section 4a is preferably composed of a material having a thermal conductivity of 0.3 or more and preferably 1.0 or more. In this case, cooling by cooling air to be introduced into a gap section 2 from the cooling air pipe 8, described below, is easily transmitted to the inside of the inner main body section 4a (the inner housing section 4), thereby making it possible to efficiently cool the inside of the inner main body section 4a.

Although the material is not particularly limited, examples of the material include silver, copper, gold, and aluminum. Among them, aluminum is favorably used as the material.

The inner front cover section 4b has a disk shape that matches a shape of the front end of the inner main body section 4a, and has an inner opening section 41b provided at its substantial center. That is, the inner front cover section 4b has a donut shape.

Although the inner front cover section 4b is smaller than the front cover section 6, the inner opening section 41b is of substantially the same size as the opening section 61.

The inner opening section 41b is at a position corresponding to the lens of the monitoring camera 1 and the opening section 61 in the front cover section 6. Therefore, the monitoring camera 1 contained in the inner housing section 4 shoots the outside through the inner opening section 41b and the opening section 61.

A cavity may be provided in the inner opening section 41b or a transparent member such as glass or a film may be attached to the inner opening section 41b unless it prevents shooting.

The inner front cover section 4b supports a lens cover 1a of the above-described monitoring camera 1 when the lens cover 1a is inserted into the inner opening section 41b. As a result, even when the weight of the lens cover 1a of the monitoring camera 1 is large, the monitoring camera 1 can be reliably fixed.

As a material composing the inner front cover section 4b, the same material as the above-described material for the inner main body section 4a can be adopted.

The material for the inner front cover section 4b may be the same as or different from that for the inner main body section 4a.

The inner rear cover section 4c has a disk shape that matches a shape of the rear end of the inner main body section 4a, and includes a stage section 41 extending forward.

The monitoring camera 1 is placed on the stage section 41.

Therefore, the monitoring camera 1 is placed on the stage section 41, and is attached to the inner housing section 4 when the lens cover 1a attached to the above-described monitoring camera 1 is supported on the inner front cover section 4b.

At this time, the monitoring camera 1 is placed on the stage section 41 not to contact the inner main body section 4a (the inner wall of the inner housing section 4). That is, the monitoring camera 1 contacts only the stage section 41, and there is a space between the monitoring camera 1 and the inner main body section 4a.

As a result, the contact area between the monitoring camera 1 and the inner housing section 4 can be made as small as possible. Thus, even if heat is transmitted to the inner main body section 4a, the heat can be prevented from being transmitted to the monitoring camera 1.

As a material composing the inner rear cover section 4c, the same material as the above-described material for the inner main body section 4a can be adopted.

The material for the inner rear cover section 4c may be the same as or different from that for the inner main body section 4a or the inner front cover section 4b.

Only the stage section 41 in the inner rear cover section 4c may be composed of another material.

The stage section 41 is composed of a material having a thermal conductivity of 0.3 or more and preferably 1.0 or more, like the inner main body section 4a. In this case, cooling by cooling air to be introduced into the gap section 2 from the cooling air pipe 8, described below, is transmitted to the monitoring camera 1 from the inner rear cover section 4c via the stage section 41, thereby making it possible to cool the monitoring camera 1.

The support section 71 in the rear cover section 7 is attached to the rear side of the inner rear cover section 4c, and the support section 71 supports the inner rear cover section 4c. That is, in the housing section 3, the support section 71 supports the inner housing section 4.

At this time, the gap section 2 as a space is formed between an outer wall of the inner main body section 4a and an inner wall of the main body section 31, between the inner front cover section 4b and the front cover section 6, and between the inner rear cover section 4c and the rear cover section 7.

The gap section 2 is an air layer having a low thermal conductivity. Thus, even if heat is transmitted to the housing section 3, the heat can be further efficiently prevented from being transmitted to the inner housing section 4 and the monitoring camera 1 contained therein.

In the monitoring camera device A, the cooling air pipe 8 has its end connected to an air supply source not illustrated and its other end attached to the rear cover section 7 via the vortex cooler C.

The inside of the cooling air pipe 8 communicates with the gap section 2 in the housing section 3 via the inside of the vortex cooler C. Accordingly, cooling air to be supplied from the air supply source unidirectionally flows through the gap section 2 and is released from the opening section 61 in the front cover section 6 when introduced into the housing section 3 from the cooling air pipe 8.

Thus, in the monitoring camera device A, fresh cooling air flows through the housing section 3. Accordingly, the inside of the housing section 3 can be efficiently cooled, and air to be released makes it possible to prevent a contaminant from adhering to the front of the monitoring camera 1 and from entering the housing section 3 from the opening section 61.

In the monitoring camera device A, the vortex cooler C includes the attachment section C1, and is attached to the rear cover section 7 when the attachment section C1 is inserted into the through hole H provided in the rear cover section 7.

The cooling air pipe 8 and the air spraying pipe 51, described above, are attached to the vortex cooler C.

The vortex cooler C exhibits a function of separating air that has flowed therein into cooled air and air heat-exhausted from the cooled air. Accordingly, an inlet port for introducing air, a cooling-side outlet port for making cooled air flow out, and a heat exhaust-side outlet port for making heat-exhausted air flow out are formed in the vortex cooler C.

The cooling-side outlet port is formed in the attachment section C1 in the vortex cooler C.

Accordingly, when the attachment section C1 is fitted into the through hole H, the cooling-side outlet port is arranged in the housing section 3.

In the monitoring camera device A, cooling air supplied to the cooling air pipe 8 from the air supply source flows into the vortex cooler C through the inlet port, is further cooled, is released from the cooling-side outlet port, and is introduced into the housing section 3.

Heat-exhausted air is released from the heat exhaust-side outlet port and is supplied to the air spraying section 5.

Thus, in the monitoring camera device A, respective air supply sources of the cooling air pipe 8 and the spraying air pipe 51 are made common by using the vortex cooler C, thereby making it possible to cool the housing section 3 and spray air by the air spraying section 5 with high energy efficiency.

An attachment structure of the cooling air pipe 8 and the spraying air pipe 51 to the rear cover section 7 can be made simple.

In the monitoring camera device A, the air spraying section 5 includes the spraying air pipe 51 and a nozzle section 52 attached to a distal end of the spraying air pipe 51.

A rear end of the spraying air pipe 51 is attached to the side, on which heat-exhausted air is released, of the above-described vortex cooler C.

Therefore, the spraying air pipe 51 is attached to the rear cover section 7 via the vortex cooler C.

Figure 4:
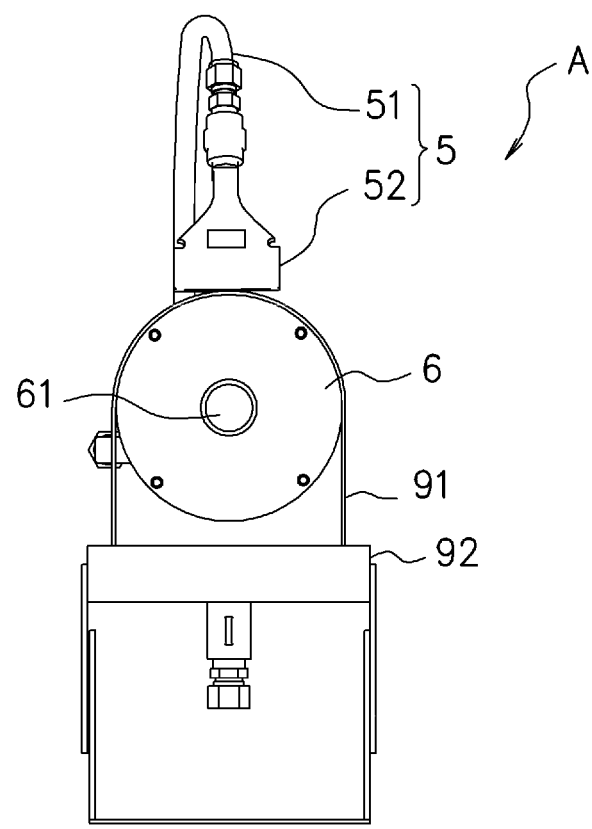
FIG. 4 is a front view illustrating the monitoring camera device according to the present embodiment.

FIG. 4 is a front view illustrating the monitoring camera device A according to the present embodiment.

As illustrated in FIG. 4, the spraying air pipe 51 has a structure extending forward by wrapping around the upper side of the housing section 3 from the rear cover section 7.

As a result, the nozzle section 52 at the distal end can spray air toward at least the front of the monitoring camera 1.

The nozzle section 52 has its distal end having a shape of an opened fan in a top view, and can spray spraying air toward a wide range from a nozzle port provided at the distal end.

The nozzle port is provided with a rib, to guide spraying air to be sprayed from the nozzle port forward without diverting the spraying air sideward.

The air spraying section 5 sprays spraying air supplied from the spraying air pipe 51 toward the front of the monitoring camera 1 from the nozzle section 52. When spraying air is sprayed toward the front of the monitoring camera 1, a part of the spraying air may be directly sprayed toward the monitoring camera 1. As a result, a contaminant can be prevented from adhering to the monitoring camera 1.

The monitoring camera device A according to the present embodiment is fixed by a strip-shaped frame 91 attached to cross a substantial center of the main body section 31 in the housing section 3. As a result, even if mechanical vibration is transmitted to the monitoring camera device A in a papermaking process, the monitoring camera device A can be prevented from dropping, for example.

A box-shaped receiving section 92 is provided below the housing section 3 in the monitoring camera device A. As a result, when a contaminant adheres to an outer wall of the monitoring camera device A, the contaminant can be received by the receiving section 92 even if accumulated to drop. As a result, even if the contaminant drops from the monitoring camera device A, wet paper or the like can be prevented from being contaminated.

The monitoring camera device A according to the present embodiment can be used for a monitoring camera system including a papermaking machine.

That is, the monitoring camera system includes the papermaking machine, the monitoring camera device A for monitoring a constituent member in the papermaking machine, and a control device connected to the monitoring camera device A via a network.

The monitoring camera system makes it possible to prevent a defect from occurring in paper by monitoring the constituent member.

Figure 5:
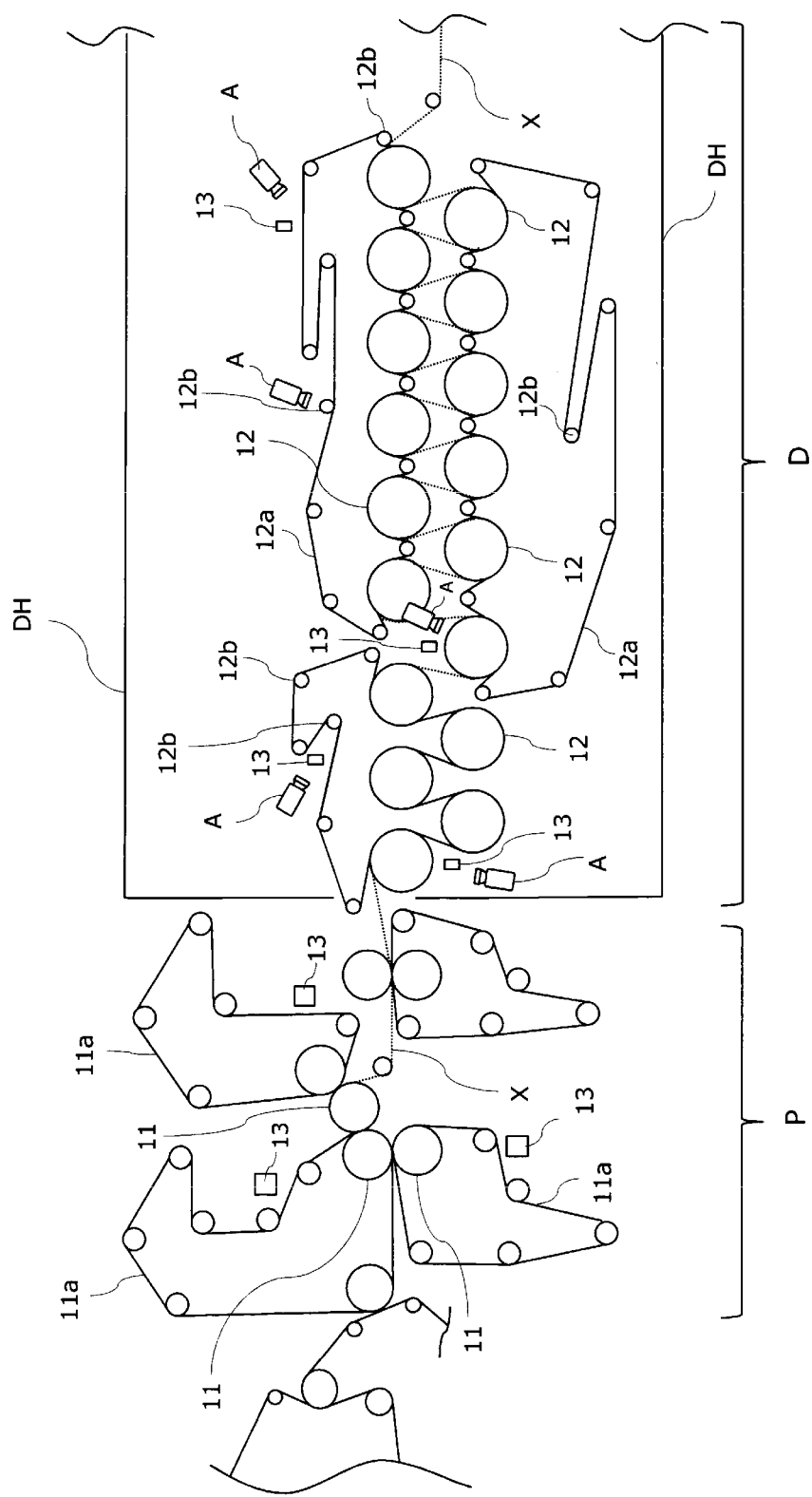
FIG. 5 is a schematic view for describing a constituent member in a papermaking machine to which the monitoring camera device according to the present embodiment is attached in a monitoring camera system.

FIG. 5 is a schematic view for describing the constituent member in the papermaking machine to which the monitoring camera device A according to the present embodiment is to be attached in the monitoring camera system.

As illustrated in FIG. 5, the papermaking machine generally includes a wire part (not illustrated) for placing a liquid having pulps dispersed in its water on a wire (net) (not illustrated) for papermaking and naturally dropping extra water to obtain wet paper X, a press part P for passing the wet paper X between paired press rolls 11, pressing the wet paper X by the press rolls 11 via a felt 11a, to shift water in the wet paper X to the felt 11a, thereby dehydrating the wet paper X, a dryer part D for making the wet paper X that has passed through the press part P contact a heated dryer roll 12 via a canvas 12a in a dryer hood DH to dry the wet paper X into paper, a calendar part (not illustrated) for adjusting the paper thickness and the smoothness of paper by a breaker stack roll and processing paper into a calendar by a calendar roll, and a reel part (not illustrated) for winding paper around a rod called a spool.

The dryer hood DH is a hollow-shaped housing, and contains the dryer roll 12, the canvas 12a, and a canvas roll 12b that guides the canvas 12a.

The monitoring camera device A monitors the inside of the dryer hood DH.

For example, the monitoring camera device A monitors a surface of the dryer roll 12, a surface of the canvas 12a, and a surface of the canvas roll 12b. Wet paper directly or indirectly contacts these constituent members. Accordingly, if a contaminant adheres to the constituent members, the contaminant is transferred onto the wet paper, causing wet paper contamination.

The inner side of a ceiling of the dryer hood DH, a surface of an application device 13, and a surface of a canvas cleaning device (not illustrated) are monitored. When a contaminant adheres to the constituent members, the contaminant drops on the wet paper and the constituent members to be directly or indirectly contacted by the wet paper, thereby similarly causing wet paper contamination.

Therefore, the monitoring camera device A makes it possible to early find adhesion of a contaminant, prevent wet paper contamination and paper breakage, and early cope, even if wet paper contamination and paper breakage occur, with the wet paper contamination and the paper breakage.

In the dryer hood DH, a surface of wet paper itself can also naturally be monitored.

In the monitoring camera system, the application device 13 for applying a chemical solution to a constituent member is attached to the papermaking machine.

Examples of the chemical solution include an antifouling agent for preventing a contaminant from adhering to the constituent member.

A control device includes a CPU (central processing unit), a RAM (random access memory), a ROM (read only memory), an external storage device, an input unit, and an output unit, and has a similar configuration to that of a normal computer.

In the monitoring camera system, a video image picked up by the monitoring camera device A is received via the network, and a state of the papermaking machine and occurrence of a contaminant are detected based on the received video image. Such detection can also be performed by person's visual observation via a video image or performed with a program.

If occurrence of a contaminated portion or its sign are seen, feedback control is performed for an operation of the papermaking machine depending on the type or the amount of the contaminant.

Such feedback control can also be manually performed or automatically performed with a program.

Specifically, the control device performs control to increase or decrease the amount of the antifouling agent to be applied by a constituent member to be monitored or the application device 13 positioned on the upstream side thereof, change the type of the antifouling agent, or apply a new chemical agent, for example.

The monitoring camera system makes it possible to also perform stable monitoring for the inside of the dryer hood DH in the papermaking machine where processing is performed under a high-temperature environment and to monitor a portion where wet paper contamination and paper breakage occur by using the monitoring camera device A.

When the monitoring camera device A is used, the type, the number, and the size of contaminants can be monitored. Correspondingly, the control device can adjust the type of the antifouling agent and the amount of the antifouling agent to be applied by the application device 13. As a result, the quality can be maintained without stopping the operation of the papermaking machine.

Even when there occurs a contaminant large enough to stop the operation of the papermaking machine and maintain the papermaking machine, occurrence of such a situation is immediately found so that the situation can be early coped with.

Although the preferred embodiment of the present invention has been described above, the present invention is not limited to the above-described embodiment.

In the monitoring camera device A according to the present embodiment, one monitoring camera 1 is installed in the housing section 3. However, a plurality of monitoring cameras 1 can also be installed in the housing section 3 so that a plurality of directions can be shot. In this case, the respective positions and numbers of opening sections 61 and air spraying sections 5 can be adjusted depending on respective shooting directions of the monitoring cameras 1.

Although the shape of the housing section 3 is a cylindrical shape in the monitoring camera device A according to the present embodiment, the present invention is not limited to this. For example, the shape may be a hollow prism shape.

Although the monitoring camera 1 is placed on the stage section 41 in the monitoring camera device A according to the present embodiment, the present invention is not limited to this. For example, a support section may be provided in the inner housing section 4 to support the monitoring camera 1.

Although the cooling air pipe 8 and the spraying air pipe 51 are attached to the rear cover section 7 in the monitoring camera device A according to the present embodiment, the present invention is not limited to this. For example, the cooling air pipe 8 and the spraying air pipe 51 may be attached to the top of the housing section 3.

Although the heat insulating material 32 is embedded in the main body section 31 in the outer housing section 3 in the monitoring camera device A according to the present embodiment, which is not necessarily essential.

A heat insulating material may be embedded in only the inner main body section 4a in the inner housing section 4, or heat insulating materials may be respectively embedded in both the main body section 31 and the inner main body section 4a.

Although the cooling air pipe 8 and the spraying air pipe 51 are attached to the rear cover section 7 via the vortex cooler C in the monitoring camera device A according to the present embodiment, the present invention is not limited to this.

For example, the cooling air pipe 8 and the spraying air pipe 51 may be independently attached to the rear cover section 7.

Figure 6:
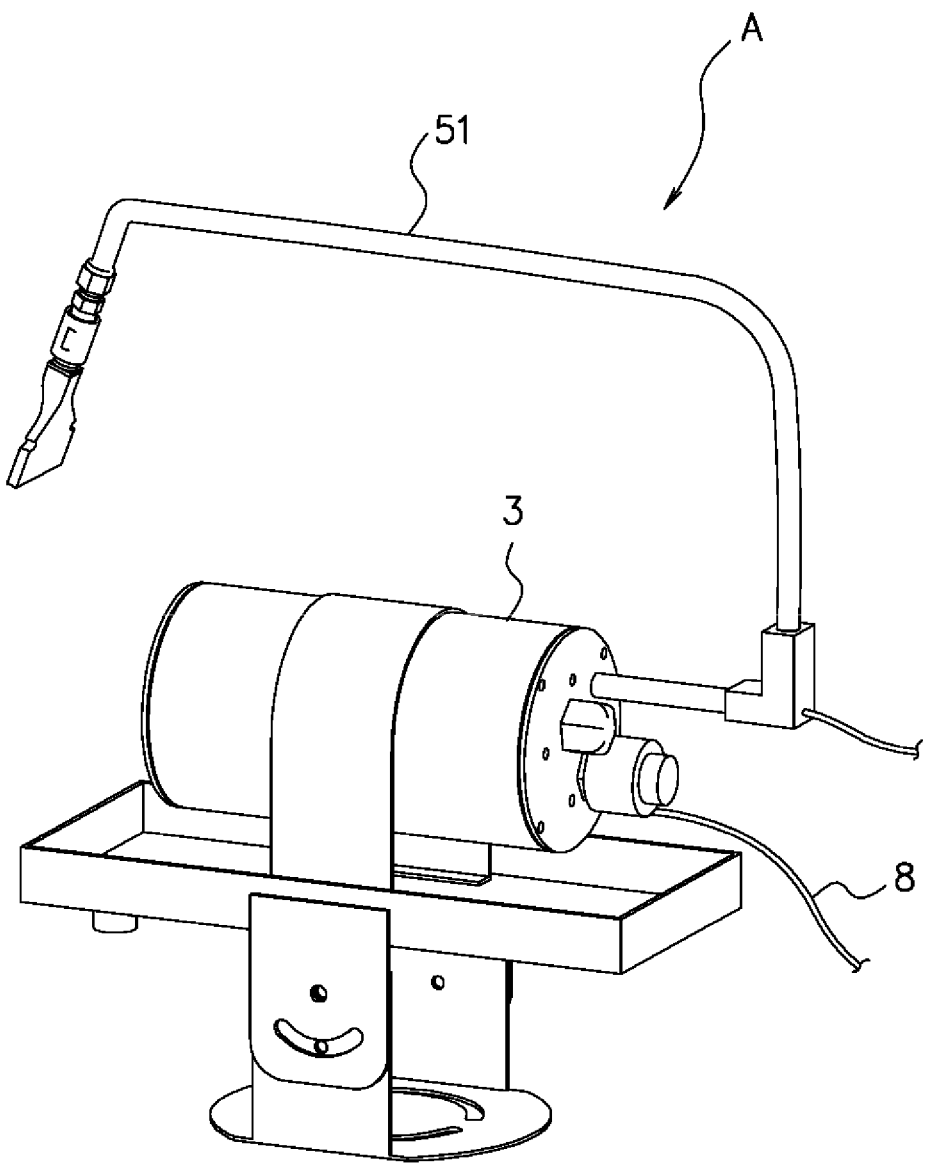
FIG. 6 is a perspective view illustrating a monitoring camera device according to another embodiment.

FIG. 6 is a perspective view illustrating a monitoring camera device A according to another embodiment.

As illustrated in FIG. 6, a cooling air pipe 8 is attached to a rear cover section 7, and a spraying air pipe 51 is attached to the rear cover section 7 via an arm extending rearward from the rear cover section 7.

In this case, the cooling air pipe 8 and the spraying air pipe 51 are respectively connected to independent air supply sources.

When the independent air supply sources are respectively used for the cooling air pipe 8 and the spraying air pipe 51, the temperatures and the pressures of air to be respectively supplied to the cooling air pipe 8 and the spraying air pipe 51 can be easily adjusted.

Although the monitoring camera device A according to the present embodiment has been described using the papermaking machine as a specific example of the device, the monitoring camera device A may be used to monitor devices in industrial fields other than the papermaking machine.

Although the inside of the dryer hood DH in the papermaking machine is monitored in the monitoring camera device A according to the present embodiment, the monitoring camera device A may be used to monitor a wire (not illustrate), a felt 11a, a breaker stack roll (not illustrated), a calendar roll (not illustrated), or the like.

INDUSTRIAL APPLICABILITY

The monitoring camera device A according to the present invention is favorably used to perform shooting for monitoring a constituent member in a papermaking machine.

The monitoring camera device A according to the present invention makes it possible to protect the monitoring camera 1 from heat and a contaminant and perform stable shooting of a device under a high-temperature environment.

REFERENCE SIGNS LIST

1 . . . monitoring camera,
1a . . . lens cover,
2 . . . gap section,

3 . . . housing section,
31 . . . main body section,
32 . . . heat insulating material,
4 . . . inner housing section,
41 . . . stage section,
4a . . . inner main body section,
4b . . . inner front cover section,
41b . . . inner opening section,
4c . . . inner rear cover section,
5 . . . air spraying section,
51 . . . spraying air pipe,
52 . . . nozzle section,
6 . . . front cover section,
61 . . . opening section,
7 . . . rear cover section,
71 . . . support section,
8 . . . cooling air pipe,
91 . . . frame
92 . . . receiving section,
11 . . . press roll,
11a . . . felt,
12 . . . dryer roll,
12a . . . canvas,
12b . . . canvas roll,
13 . . . application device,
A . . . monitoring camera device,
C . . . vortex cooler,
C1 . . . attachment section,
H . . . through hole,
D . . . dryer part
DH . . . dryer hood,
P . . . press part, and
X . . . wet paper.

The invention claimed is:

1. A monitoring camera device used for monitoring a device under a high-temperature and a humid environment, the monitoring camera device comprising:
    a monitoring camera exposed to the device;
    an inner housing section containing the monitoring camera; and
    a housing section containing the inner housing section; and
    a cooling air pipe for introducing cooling air into the housing section,
    the housing section includes a cylindrical main body section and a rear cover section attached to a rear end of the main body section, and
    the cooling air pipe is attached to the rear cover section, wherein
    the rear cover section supports the inner housing section,
    a gap section is provided between the housing section and the inner housing section, and
    the cooling air flows through the gap section and is sprayed toward the front of the monitoring camera.

2. The monitoring camera device according to claim 1, further comprising
    a front cover section attached to a front end of the main body section, wherein
    the front cover section is provided with an opening section, and
    the cooling air is released from the opening section.

3. The monitoring camera device according to claim 1, wherein
    the inner housing section is provided with a stage section, and
    the monitoring camera is placed on the stage section not to contact an inner wall of the inner housing section.

4. The monitoring camera device according to claim 1, wherein
    the main body section has a heat insulating material embedded in its peripheral direction.

5. The monitoring camera device according to claim 1, further comprising
    an air spraying section including a spraying air pipe attached to the rear cover section and a nozzle section attached to a distal end of the spraying air pipe,
    wherein the nozzle section can spray air toward at least the front of the monitoring camera from the outside of the housing section.

6. The monitoring camera device according to claim 1, wherein the monitoring camera device is used in a dryer hood in a papermaking machine under a high-temperature environment at a temperature of 45° C. or more.

* * * * *